DELAY EQUALIZER COMPUTER

Filed Aug. 3, 1964

INVENTORS H. E. BOMAR
H. A. CLINE
BY J. P. Kearns
ATTORNEY

April 9, 1968 H. E. BOMAR ET AL 3,377,441

DELAY EQUALIZER COMPUTER

Filed Aug. 3, 1964 2 Sheets-Sheet 2

United States Patent Office 3,377,441
Patented Apr. 9, 1968

3,377,441

DELAY EQUALIZER COMPUTER

Howard E. Bomar, North Highlands, and Harry A. Cline, Carmichael, Calif., assignors to American Telephone and Telegraph Company, New York, N.Y., a corporation of New York Filed Aug. 3, 1964, Ser. No. 387,154
5 Claims. (Cl. 179—175.3)

ABSTRACT OF THE DISCLOSURE

An analog computer for selecting the number and type of delay equalizers required to compensate a voice-band transmission facility. A linear relation is established between the known delay at selected frequencies of a transmission facility and of available equalizers and resistance values in the computer. The resistance values are arranged in an array in circuit between a constant-current source and an oscilloscope. Selected resistance values which render the trace on the oscilloscope essentially flat horizontally are then indicative of the correct combination of equalizers to compensate the particular transmission facility for delay distortion.

This invention relates to the compensation of transmission facilities for delay distortion and, in particular, to the computation by analog means of the appropriate amount of equalization to be applied to a particular transmission facility.

The process of envelope delay compensation of telephone cable, open-wire, carrier and associated transmission equipment in the voice frequency range involves the addition of envelope delay equalizer units in tandem with the equipment. Delay distortion is the transmission system characteristic which results from nonlinearity in the phase shift among the different frequency components. This nonlinearity causes different frequencies in a transmitted wave to arrive at the receiver at different times.

The delay distortion problem has always been present in the voice telephone network. Speech, however, is relatively insensitive to phase nonlinearity. Therefore, less attention has been accorded delay distortion in the telephone network than attenuation distortion. The need has now arisen for the transmission of digital data at high speeds over the telephone network. The worse the delay distortion, the worse is the intersymbol interference. High-speed digital data becomes unintelligible when transmitted over an uncompensated telephone network. Unfortunately, there is no simple solution to the envelope delay distortion problem. Each transmission path exhibits a different characteristic due to the combining of transmission facilities of different types in a given path.

A family of stock or off-the-shelf equalizers constructed of balanced lattice networks are available to the telephone engineer. These are usually connected in tandem at the terminals of a given transmission facility. The selection of the correct combination of equalizers involves cut and try methods and tedius time-consuming calculations.

It is an object of this invention to eliminate manual calculations in the selection of delay equalizers required to compensate a particular transmission facility.

It is another object of this invention to reduce the problem of compensating a particular transmission facility for delay distortion effects to visual observation of an oscilloscope trace.

It is a further object of this invention to simulate the delay characteristic of a particular transmission facility and particular equalizers used for delay correction by linear resistive networks.

According to this invention, an analog computer to provide a solution to delay equalization problems on telephone networks is constructed of resistor banks which are capable of being switched into and out of the vertical deflection circuit of a cathode-ray oscilloscope. These resistors simulate in ohms microseconds of delay distortion. They are connected across a regulated power supply in columns corresponding to particular frequencies within the transmission band to be compensated. Taken in rows a particular bank of resistors simulates the delay at particular frequencies of interest of a transmission facility by using an arrangement of adjustable decades and of stock equalizers by fixed-value elements. Each separate bank of resistors simulating equalizer networks is arranged to be switched into or bypassed out of the columns. Dials on the switches are read to indicate the quantity and types of equalizers required to compensate the real transmission facility.

The portion of the power supply voltage developed across the resistor columns is applied through a rotating scanning switch to the vertical deflection circuits of a cathode-ray oscilloscope in one particularly effective display arrangement. A synchronized rotating scanning switch connected to a stepped voltage divider controls the horizontal deflection of the cathode-ray oscilloscope.

In operation all resistors simulating equalizers are initially bypassed and taken out of circuit with the oscilloscope while the decade switches are set to simulate the nonlinear delay of the transmission facility. The delay characteristic is typically of parabolic shape with a minimum delay near the center of the voice frequency band and increasing in both directions away from midband. With the scanning switches in operation a representation of the delay curve is traced on the oscilloscope screen. Delay equalizer simulator resistor sections are switched into the vertical deflection circuit until the curve on the oscilloscope screen becomes as flat horizontally as it is practicable to achieve. The required combination of delay equalizers is then read from the switch settings.

A feature of this invention is the conversion of delay time in microseconds to resistance in ohms at preselected key frequencies in the frequency band being compensated.

Other objects, features and advantages of this invention will be appreciated from a consideration of the following detailed description and the drawing in which.

Figure 1:
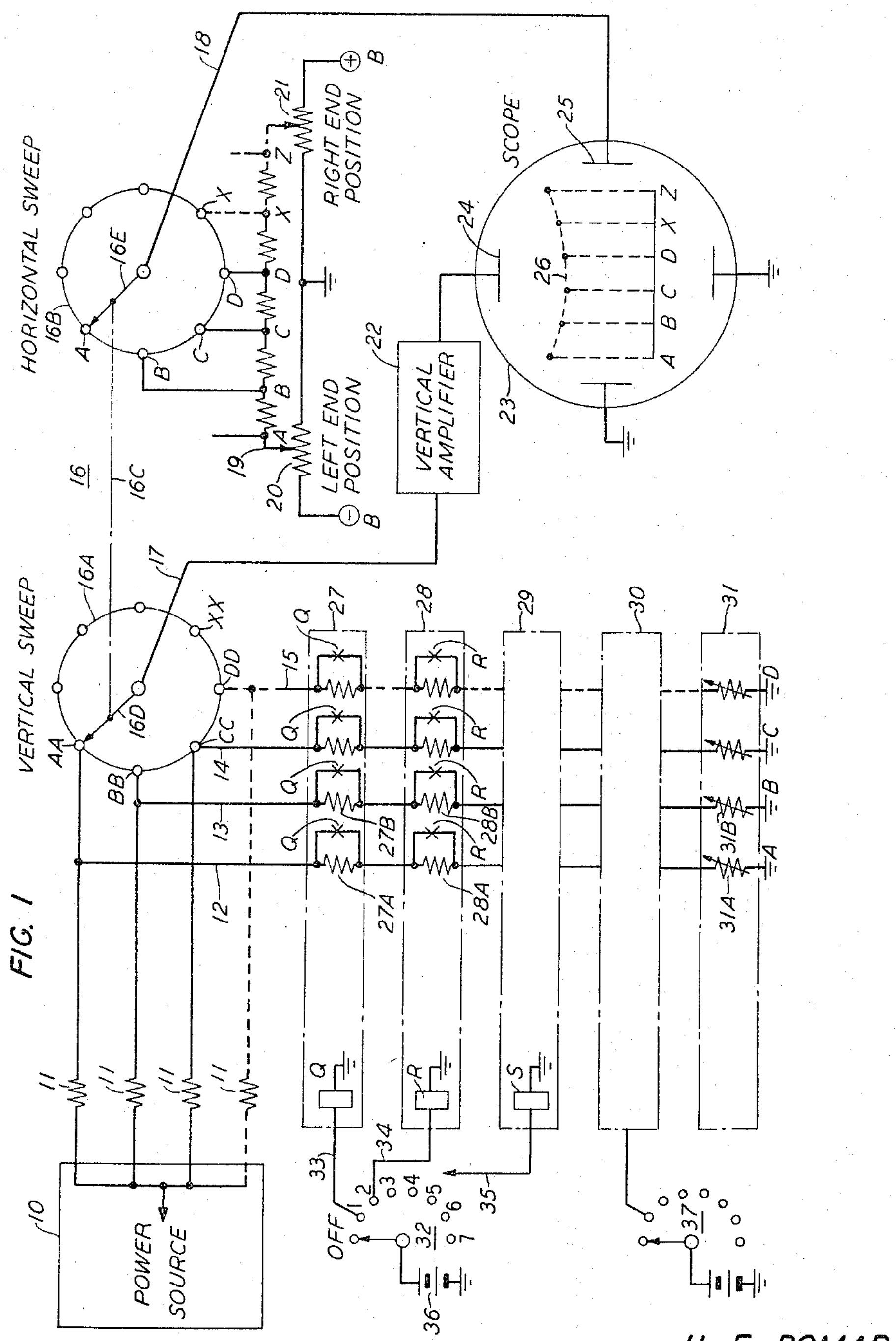
FIG. 1 is a block schematic diagram of the synthetic envelope delay computer of this invention.

FIG. 1 shows the over-all arrangement of the synthetic delay computer of this invention. The process of envelope delay correction of cable, open-wire and carrier equipment in the voice-frequency range involves the addition of envelope delay equalizer units in tandem with the transmission facilities. This invention simulates the delay in microseconds of the transmission facility and of standard equalizers in ohms of resistance. In FIG. 1 a power source 10 provides a plurality of constant voltage outputs. Essentially constant-current outputs are available through high resistances 11 to a plurality of voltage dividers including lines such as those designated 12, 13, 14 and 15. A plurality of equalizer simulators, such as those indicated as 27, 28, 29 and 30, are connected to these lines. A final transmission facility simulator 31 is provided at ground level. Each equalizer simulator and the facility simulator includes a plurality of resistors connected in series column by column from lines 12 through 15 and grounds A, B, C and D. While only four columns are shown it is to be understood that for adequate simulation there should be a column for about every 200 cycles in the voice frequency band. The following frequencies in cycles per second were found to be suitable in a practical embodiment: 300, 500, 600 and the remaining even hundreds up to 3200. This is a total of sixteen frequencies, necessitating sixteen columns of resistors across power supply 10. When other frequency bands are to be accommodated, appropriate selection of discrete frequencies within the frequency band of interest can be made in a similar manner.

Figure 3:
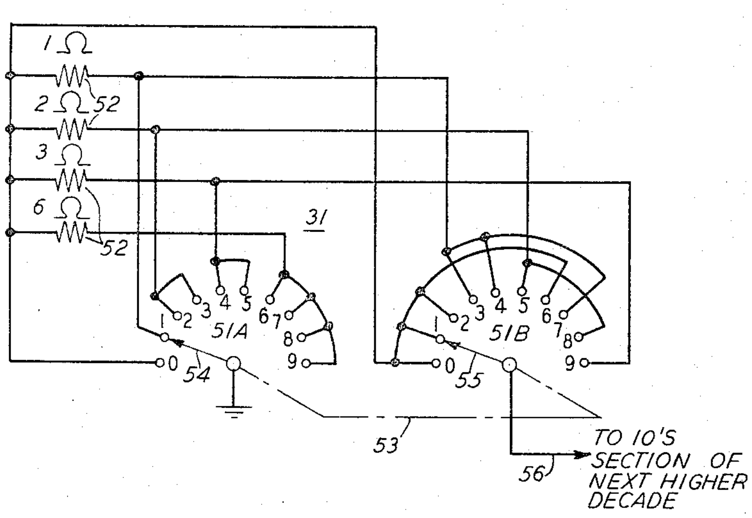
FIG. 3 is a schematic diagram of a representative decade resistor arrangement using only four resistors per decade.

The facility simulator 31 may conveniently be constructed in a decade switched arrangement as shown in FIG. 3. Each adjustable resistor such as 31A and 31B of block 31 on FIG. 1 can comprise about four decades as shown in FIG. 3 for units, tens, hundreds and thousands.

A typical transmission facility may exhibit up to 3000 microseconds of delay at the high and low ends of the voice frequency band relative to the minimum delay at some midband frequency.

A unit's decade comprises two ganged selector switches 51A and 51B, and four resistors of values 1, 2, 3 and 6 ohms as shown in FIG. 3. Each switch bank has ten positions numbered 0 through 9. Dashed line 53 represents the mechanical ganging. The wiper arm 54 of bank 51A is grounded as shown, and the wiper arm 55 of bank 51B is connected by way of output lead 56 to the next higher ten's decade. The zero contacts of both banks are connected together and to one end of each of resistors 52, as well as to contacts 1, 2, and 6 of bank 51B. When the wipers are at zero position, therefore, output lead 56 is grounded. The right-hand end of the one-ohm resistor is connected to contact 1 on bank 51A and to contacts 3, 4 and 7 on bank 51B. The right-hand end of the two-ohm resistor is connected to contacts 2 and 3 on bank 51A and to contacts 5 and 8 on bank 51B. Similarly, the right-hand end of the three-ohm resistor is connected to contacts 4 and 5 on bank 51A and to contact 9 on bank 51B. Finally, the right-hand end of the six-ohm resistor is connected to contacts 6 through 9 on bank 51A. As a result of this switching arrangement movement of the wipers from the zero contact to the ninth contact advances the resistance available between lead 56 and ground from zero through nine ohms. For example, at contact 1, an obvious path is closed from ground to lead 56 through the one-ohm resistor. At contact 5 the two- and three-ohm resistors are placed effectively in series between ground and lead 56. At contact 9 the six-and three-ohm resistors are in series. The other combinations may be similarly traced.

The higher decades are the same as the unit's decade except that the resistance values are multiplied by 10, 100 and 1000.

The equalizer blocks 27 through 30 shown in FIG. 1 comprise fixed resistors such as 27A, 27B, 28A and 28B. Each block also includes a multicontact relay, such as indicated by Q, R and S. Make contacts are shunted across each resistor as shown, so that release of the given relay places the corresponding resistors in circuit.

Blocks 27, 28 and 29 represent one, two and four, respectively, of a particular standard equalizer. Relays Q, R and S are controlled manually through a selector switch 32 in any combination. A battery 36 connected to the wiper arm of switch 32 powers the relays in the selected combinations. Leads 33, 34 and 35 join particular contacts of the switch to relays Q, R and S respectively, as shown in more detail in FIG. 2.

Figure 2:
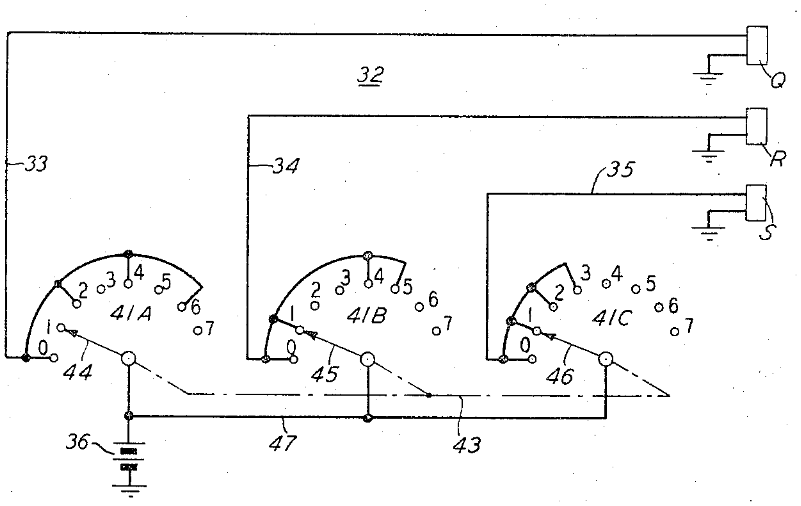
FIG. 2 is a schematic diagram of a switching arrangement for cutting in rows of resistors simulating particular delay equalizer combinations of the same type singly and in tandem.

FIG. 2 represents one arrangement for controlling the three relays Q, R and S in different combinations. The front contacts of the relays are assumed to be shunting the simulator resistors, so that the resistors are placed in circuit when the relays are in their released condition. This arrangement is chosen merely because multicontact relays with make contacts are more readily available. Relays with break contacts can, of course, be used with appropriate modifications. Selector 32 includes three banks 41A, 41B and 41C of at least eight contacts each. Wiper arms 44, 45 and 46 are mechanically ganged as indicated by the dashed line 43. Battery 36 is connected between ground and each wiper arm. One end of each relay is also grounded as shown. Lead 33 joins the upper end of relay Q to contacts zero, 2, 4 and 6 of bank 41A. Lead 34 joins the upper end of relay R to contacts zero, 1, 4 and 5 of bank 41B. Lead 35 joins the upper end of relay S to contacts zero, 1, 2 and 3 of bank 41C. Relay Q controls a simulator representing one of a particular type of equalizer; relay R, a simulator representing two tandem equalizers of the same type; and relay S, a simulator representing four tandem equalizers of the same type. At zero position all relays are operated so that no simulators of that type are in circuit. By way of example, at position one relay Q is released; at position three relays Q and R are released; and at position seven all relays are released. Up to seven of a particular type of equalizer singly or in tandem can be simulated in this way.

Block 30 controlled in a similar manner by switch 37 represents a simulation of equalizers of other types.

The resistance values in each equalizer simulator block are selected to correspond to the published values of delay for standard equalizers. For example, Bell System Practices Section 314–820–100 tabulates delay values in microseconds at different frequencies for 200-type delay equalizers in combinations of one through six in tandem. Interpolations are made for chosen frequencies not tabulated. A sample of such a table is reproduced below for the 200C equalizer.

| Number and Type of Equal | Frequency in Kilocycles | | | | | | | | | | | | | |
|---|---|---|---|---|---|---|---|---|---|---|---|---|---|---|
| | 0 | 0.5 | 1.0 | 1.2 | 1.4 | 1.6 | 1.8 | 2.0 | 2.2 | 2.4 | 2.6 | 2.8 | 3.0 | 3.5 |
| 1—200C | 279 | 296 | 316 | 310 | 293 | 267 | 237 | 207 | 179 | 154 | 133 | 115 | 100 | 73 |
| 2—200C | 558 | 592 | 632 | 620 | 586 | 534 | 474 | 414 | 358 | 308 | 266 | 230 | 200 | 146 |
| 3—200C | 837 | 888 | 948 | 930 | 879 | 801 | 711 | 621 | 537 | 462 | 399 | 345 | 300 | 219 |
| 4—200C | 1116 | 1184 | 1264 | 1240 | 1172 | 1068 | 948 | 828 | 716 | 616 | 532 | 460 | 400 | 292 |
| 5—200C | 1395 | 1480 | 1580 | 1550 | 1465 | 1335 | 1185 | 1035 | 895 | 770 | 665 | 575 | 500 | 365 |
| 6—200C | 1674 | 1776 | 1896 | 1860 | 1758 | 1602 | 1422 | 1242 | 1074 | 924 | 798 | 690 | 600 | 438 |

Resistors 11 in series with the power supply outputs are made large with respect to the maximum resistance of the simulators. Thus, effectively a constant current is provided to each voltage divider. The voltage at leads 12, 13, 14 and 15 therefore becomes proportional to the resistance in the simulators.

The remainder of FIG. 1 shows the instrumentation for visual observation. An oscilloscope 23 having electrostatic vertical and horizontal deflection plates 24 and 25 is driven by a scanning selector switch 16. The selector has two banks of contacts 16A and 16B. Its wipers 16D and 16E ganged through mechanical link 16C are driven by a motor (not shown) at, for example, about five cycles per second. Each selector has a plurality of contacts equal to the number of discrete frequencies chosen to be simulated within the voice frequency band. Sixteen, as previously mentioned, is a convenient number. Fewer are shown in the drawing for illustrative purposes.

Horizontal sweep selector 16B operates in conjunction with a voltage divider 19 connected across a suitable direct-current power source indicated as B–B. Divider 19 includes tapping points B, C, D, X and Z, for example, appropriately spaced to produce a horizontal trace linear with frequency. The tapping points are in turn connected on selector 16B to contacts A, B, C, D and X and others not shown. Potentiometers 20 and 21 at the ends of voltage divider 19 provide adjustment for the beginning and end points of the horizontal beam position. The wiper arm 16E is connected by lead 18 to horizontal deflection plate 25. The other horizontal plate is grounded as shown. Rotation of selector 16B will produce a horizontal trace on oscilloscope 23 in an obvious manner.

Vertical sweep selector 16A has the same number of peripheral contacts as selector 16B and is driven in synchronism therewith through mechanical connection 16C. Contacts AA, BB and so forth are connected to the junctions of the right-hand ends of resistors 11 and the vertical columns defined by leads 12 through 15. Wiper arm 16D connects through lead 17 and vertical amplifier 22 to vertical deflection plate 24 of oscilloscope 23. The other vertical plate is grounded. Rotation of wiper arm 16D produces vertical deflection of the oscilloscope trace in accordance with the voltages on the vertical resistance columns comprising the simulator banks.

The synthetic delay computer is operated in the following manner. All equalizer selectors, such as 32 and 37 are set to zero, thereby cutting out all equalizer simulator resistors. Facility decades 31 are also set to zero. When the sweep selector 16 is turned on, a horizontal row of dots appears on the oscilloscope screen 23. Controls in vertical amplifier 22 may be adjusted to set the trace near the bottom of the screen. Now the facility decades 31 are set to read equivalent values in ohms of the delay in microseconds for the transmission facility to be compensated. These values can be obtained from the line delay measured at the time of installation or from tables prepared especially for this purpose by conventional means. If the measured or calculated line-delay at 300 cycles is 1000 microseconds, for example, the 300-cycle decade is set to 1000 ohms. Voltage developed at contact AA will be proportional to 1000 ohms. The oscilloscope trace will resemble dotted trace 26 sketched in FIG. 1, representing a typical envelope delay curve, when the sweep selectors are rotating. Trace 26 has a horizontal dimension proportional to frequency in Hertz and a vertical dimension proportional to delay in microseconds. The object is now to cut in equalizers by means of switches, such as 32 and 37, until the voltages at all contacts, such as AA, BB, on the vertical sweep selector are equal. At this time the oscilloscope trace will once again be a horizontal line of dots on the screen. The absolute value of the resultant delay is immaterial. Uniform linear delay over the frequency band of interest is the objective. The number and type of equalizers required to achieve such a horizontal line are read from the equalizer cut-in control dials.

It is obvious that the oscilloscope provides a convenient visual display of the original distortion and the effect of introducing compensating equalizers. Other display means, such as a battery of voltmeters connected at points AA, BB, etc., could be used. This substitute arrangement would, of course, be exceedingly cumbersome.

While this invention has been described in connection with the disclosure of a particular embodiment, it will be understood that many modifications are possible without departing from the spirit and scope of the appended claims.

What is claimed is:

1. A system for selecting members of a class of delay equalizers having predetermined delay-frequency characteristics to compensate for the ascertained delay-distortion characteristics of a transmission line over a band of frequencies comprising:

a plurality of adjustable resistive means establishing a series of values linearly related to and simulating the delay characteristics of said transmission line measured at each of a finite plurality of frequencies within said frequency band, one or more pluralities of initially bypassed fixed resistive means, each plurality of fixed resistive means representing one or more members of said class of delay equalizers and each individual resistive means being linearly related to and simulating the delay of one or more class members at a different one of said finite plurality of frequencies, a plurality of means connecting an adjustable resistive means from said plurality thereof in series with fixed resistive means from said one or more pluralities thereof to form separate columns of series-connected resistive means for each of said finite pluralities of frequencies, the total resistance in a particular column simulating the total delay at a particular one of said frequencies, a constant-current power source supplying currents in parallel to said separate columns of series-connected resistances formed by said connecting means, the resultant potential across each column then being proportional to the delay of the compensated transmission line at the particular frequency represented by that column, oscilloscope display means, means controlling the vertical deflection of the electron beam in said display means responsive to the potentials across said columns of resistances while advancing the electron beam in the horizontal direction proportional to the frequency represented thereby, and means selectively unbypassing all the fixed resistive means representing particular known delay equalizers until a substantially horizontal electron beam trace appears on said display means, the number of pluralities of said fixed resistive means placed in circuit with said plurality of adjustable resistive means indicating the particular members of the class of delay equalizers required for compensating said transmission line.

2. Apparatus for resistive analog simulation of the delay-frequency characteristics of an electric transmission facility together with that of discrete delay equalizers of known delay-frequency characteristics comprising:

a plurality of independently adjustable resistors simulating on a proportional basis the delay inherent in a transmission facility at each of a chosen plurality of frequencies within a frequency band of interest, one or more pluralities of initially bypassed fixed resistors, each said plurality representing the delay in discrete delay equalizers at each of said chosen plurality of frequencies, means forming separate series connections for each of said chosen pluralities of frequencies of an independently adjustable resistor and one or more of said fixed resistors, each series connection representing the total delay at one of said chosen frequencies, means for selectively unbypassing individual pluralities of said fixed resistors representing particular delay equalizers from said series connections until the total resistances of all series connections are substantially equal, and means integral with said unbypassing means indicating the particular discrete delay equalizers required to compensate the delay-frequency characteristic of said transmission facility.

3. Apparatus for resistive analog simulation of the combined envelope delay characteristic of an electric transmission facility and compensating tandem-connected delay equalizers of predetermined delay-frequency characteristics over a frequency band of interest comprising:

a plurality of independently adjustable resistors simulating by units of resistance units of delay inherent in said transmission facility at each of a plurality of selected frequencies within said frequency band, a plurality of fixed resistors for each said delay equalizer, said fixed resistors being initially bypassed and simulating by units of resistance units of delay at each of said plurality of selected frequencies within said frequency band, means forming separate series connections of said adjustable and bypassed fixed resistors simulating delay at each of said selected frequencies, means supplying a constant current to each of said series connections, means sensing the voltages generated across said separate series connections by said constant currents, switching means for selectively unbypassing the individual pluralities of fixed resistors simulating particular delay equalizers in said series connections to equalize the voltages sensed across said several series connections of resistors, and means integral with said switching means indicating the particular delay equalizers required to achieve substantial equality of voltages across said series connections.

4. The method of selecting discrete delay equalizers of known delay-frequency characteristics to be used in tandem with a particular transmission facility to provide envelope delay distortion compensation over a frequency band of interest comprising the steps of:

selecting a plurality of resistance values equivalent in ohms to the measured delay in microseconds of said transmission facility at preselected frequencies within said frequency band of interest, further selecting for insertion in series with the selected resistance values a plurality of groups of other resistance values, each said group having one other resistance value equivalent in ohms to the delay in microseconds at each preselected frequency of one or more discrete delay equalizers, so as to be able to form a series connection of resistance values corresponding to each of said preselected frequencies, each series connection including one selected resistance value simulating said transmission facility and one resistance value from each group of other resistance values, measuring the total resistance in each said series connection, cutting in selectively one or more complete groups of said other resistance values from into said series connections until the measured total resistance values of the several series connections are substantially equal, and observing the number and types of cut-in groups of other resistance values as an indication of the number and types of discrete delay equalizers required to compensate the delay distortion of said transmission facility.

5. The method of claim 4 in which said measuring step includes the subsidiary steps of:

supplying a constant current to the several series connections of resistance values, the resultant voltages across the several series connections being proportional to the total delay at each preselected frequency, and displaying on the screen of an oscilloscope at instants of time proportional to said preselected frequencies the several resultant voltages across the several series connections thereby tracing the combined delay-frequency characteristic of said transmission facility and the simulated discrete delay equalizers.

References Cited

UNITED STATES PATENTS 3,213,196 10/1965 Tuck ------------ 179—175.3

WILLIAM C. COOPER, *Primary Examiner.*

KATHLEEN H. CLAFFY, *Examiner.*

A. A. McGILL, *Assistant Examiner.*